United States Patent [19]

Schatteman

[11] Patent Number: 4,467,378
[45] Date of Patent: Aug. 21, 1984

[54] TWO STEP CASSETTE RETURN MECHANISM FOR CASSETTE TAPE DECKS

[75] Inventor: Etienne A. Schatteman, Wemmel, Belgium

[73] Assignee: Staar S. A., Brussels, Belgium

[21] Appl. No.: 321,797

[22] Filed: Nov. 16, 1981

[30] Foreign Application Priority Data

Nov. 19, 1980 [BE] Belgium ............................... 886.248

[51] Int. Cl.³ ...................... G11B 5/008; G11B 15/00; G11B 15/32; G03B 1/04
[52] U.S. Cl. ................................. 360/96.5; 360/96.6; 242/198
[58] Field of Search ............... 242/198, 195; 360/96.5, 360/96.6, 96.1, 137, 69, 105, 93

[56] References Cited

U.S. PATENT DOCUMENTS

| 4,017,900 | 4/1977 | Katsurayana | 360/137 |
| 4,109,286 | 8/1978 | Katsurayama | 360/96.6 |
| 4,208,023 | 6/1980 | Demol | 242/198 |
| 4,295,169 | 10/1981 | Iwata | 360/96.5 |
| 4,325,091 | 4/1982 | Uchida | 360/96.6 |
| 4,385,332 | 5/1983 | Nakao | 360/96.6 |

Primary Examiner—Robert Martin Kilgore
Attorney, Agent, or Firm—Leydig, Voit, Osann, Mayer and Holt, Ltd.

[57] ABSTRACT

A mechanism for controlling the return movement of cassettes in slide-in type tape decks by utilizing a movable frame to return the cassettes and momentarily interrupt the return movement of the movable frame at a point in its travel where at least one of the drive members penetrating the cassettes in the operative position is still engaged in the cassettes.

8 Claims, 3 Drawing Figures

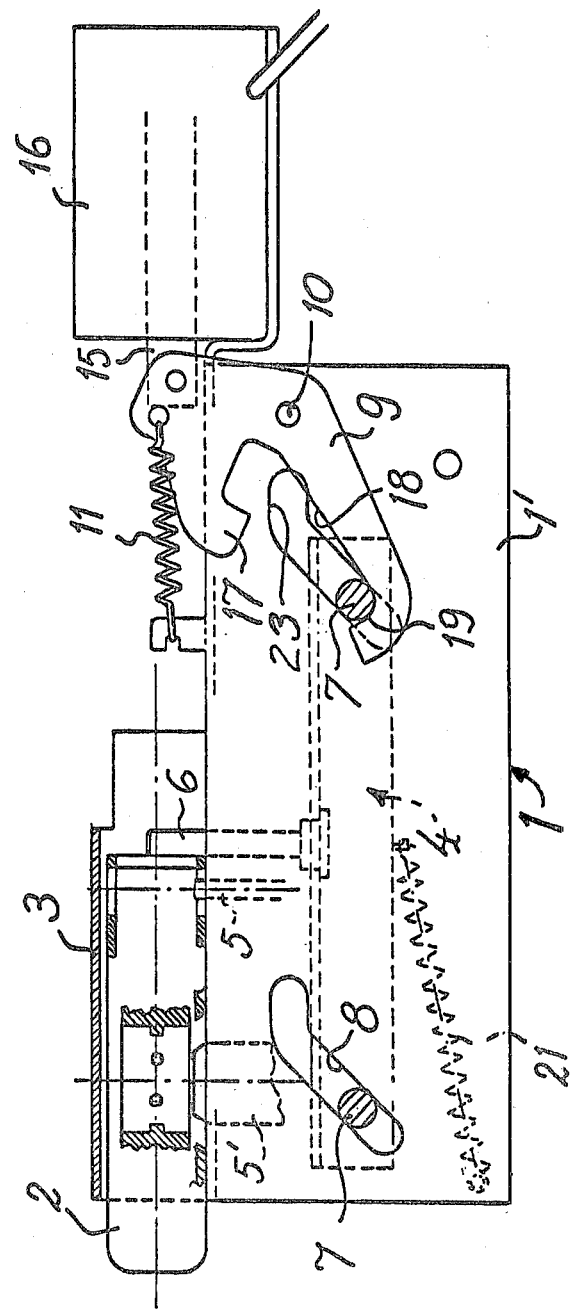

TWO STEP CASSETTE RETURN MECHANISM FOR CASSETTE TAPE DECKS

TECHNICAL FIELD

The present invention relates to cassette player/recorders and, more particularly, to cassette tape decks in which cassettes are inserted and ejected after the playing operation has been completed.

BACKGROUND ART

The term "cassette" is used herein to mean a tape cartridge of the type in which magnetic tape is carried on two reels enclosed in a flat, thin, plastic container, the tape being fed back and forth (reel-to-reel) for recording or playback. Each end of the tape is fastened to one of the reels and the tape may be provided with a pair of monaural tracks or two pair of stereo tracks for recording or playback of sound in either direction of movement of the tape within the cassette.

The term "tape deck" is used herein to mean a mechanism as described, for example, in commonly assigned U.S. Pat. Nos. 3,385,534 and 4,208,023 of the slide-in type in which a cassette is inserted and guided to operative position and which has a movable frame carrying powered capstans and reel hub spindles for drive of the tape reel-to-reel within the cassette, the cassette having openings in its faces for introduction of the capstans into the cassette and the spindles into the reel hubs in the course of movement of the cassette to operative position, so that the tape may be unwound from one reel, moved past the recording or playback heads, and wound on the other reel. Recording and playback heads are included on a fixed frame and adapted to be connected to suitable electronic circuits, microphones or speakers, so as to be capable of recording on or playing sound from the tape.

In the course of the movement of the cassette to operative position, the capstans and reel hub spindles are caused to penetrate the cassette by movement of the movable frame substantially perpendicularly relative to the cassette, and are retracted from the cassette on the return movement of the movable frame so as to insure that the cassette is positively separated from these drive members as it is returned.

In such slide-in type tape decks, the return movement of the movable frame is utilized to return the cassette; the return movement is produced by gravity and/or springs biasing the movable frame to its fully returned position. Where the return movement of the movable frame is utilized to return the cassette, the cassette may be forcefully ejected from the tape deck rather than placed into its original position where the user can easily take hold of it to remove it or push it in for replaying.

Previous attempts to control the return movement of the cassette and reduce the forcefulness with which the cassette is returned have involved braking the return movement of the cassette by means of leaf springs, pivoting doors and other devices interacting with uneven surfaces provided on the walls of the cassette. However, these devices have not been fully satisfactory since the devices generate resistance which must be overcome when the cassette is shifted into the operative position.

The problem of controlling the return movement of cassettes which has existed with the compact cassettes offered for several years on the market becomes crucial with micro-cassettes since the cases of these are perfectly parallelepipedic and do not have any unevenness which may be utilized to brake the movement of the cassette.

DISCLOSURE OF INVENTION

The principal object of the present invention is, therefore, to control the return movement of cassettes in tape decks and reduce the forcefulness with which the cassettes are returned without generating resistance which must be overcome as the cassettes are inserted and moved to operative position, and thereby cause the cassettes to be placed precisely in their original position in the tape deck.

A more specific object of the invention is to control the return movement of cassettes in slide-in type tape decks by utilizing a movable frame to return the cassettes and momentarily interrupting the return movement of the movable frame at a point in its travel where at least one of the drive members penetrating the cassettes in the operative position is still engaged in the cassettes.

BRIEF DESCRIPTION OF THE DRAWINGS

Further objects will be apparent from the following description taken in connection with the accompanying drawings in which:

FIG. 3 is a view similar to FIGS. 1 and 2 illustrating the movable frame in an intermediate position momentarily interrupted in its return movement.

BEST MODE FOR CARRYING OUT THE INVENTION

Figure 1:
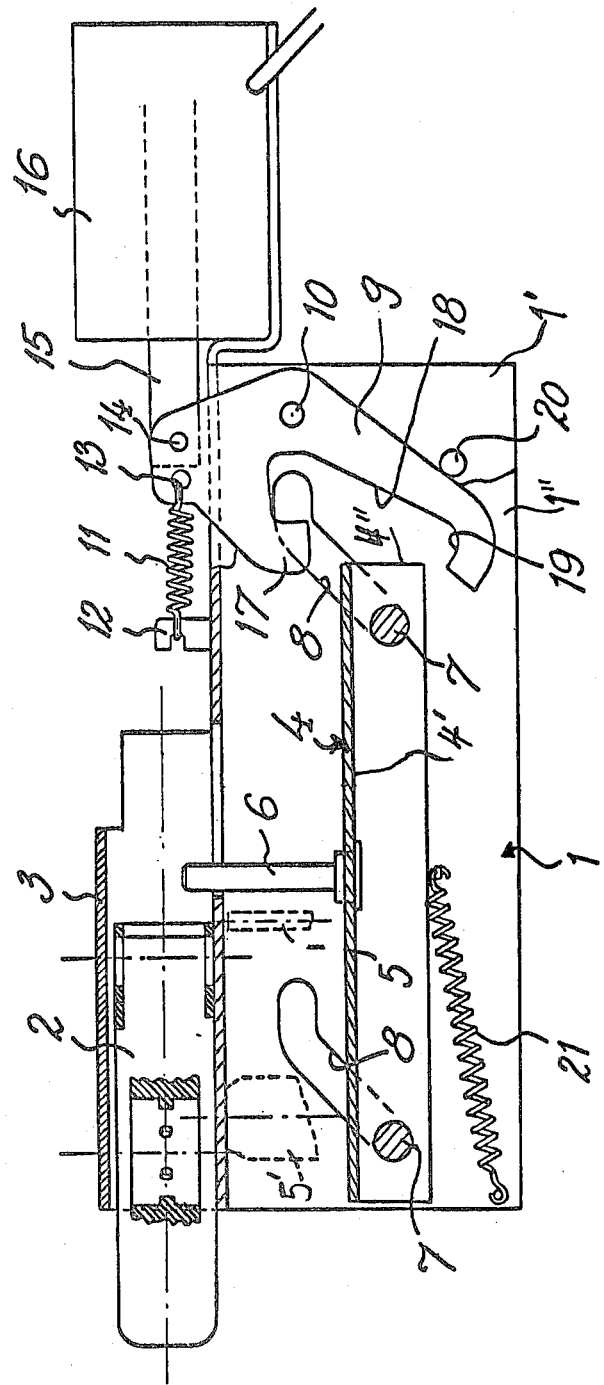
FIG. 1 is a side elevation with parts broken away and parts in section of a tape deck constructed in accordance with this invention having a movable frame shown in the fully returned position.
Figure 2:
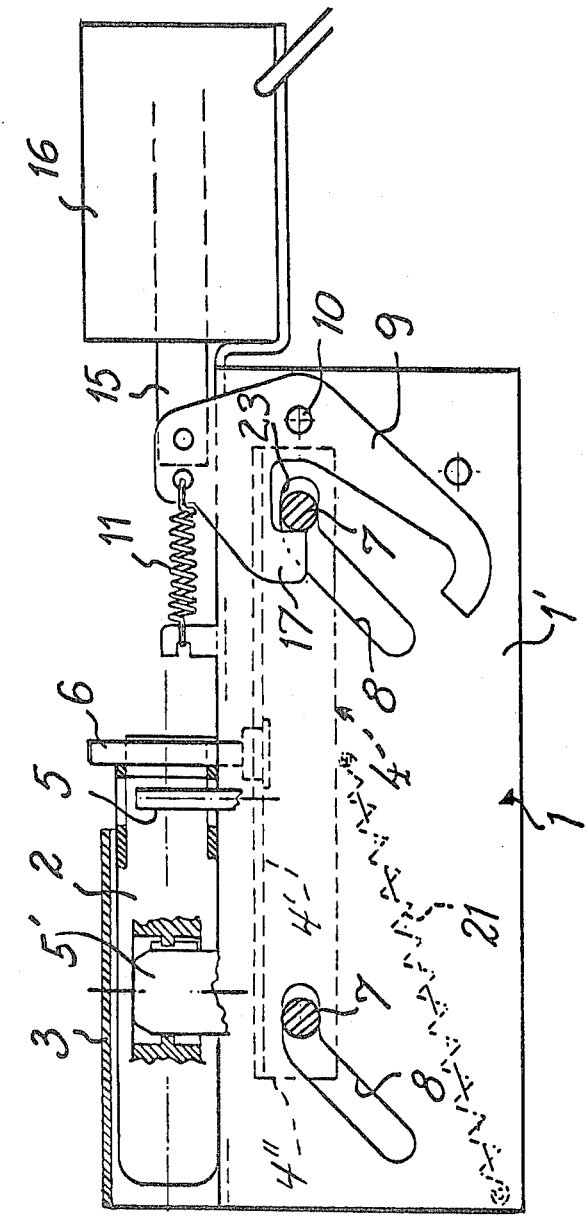
FIG. 2 is a view similar to FIG. 1 illustrating the movable frame of the tape deck in the operative position.

Referring to the drawings, a tape deck is illustrated having a fixed frame 1 on which slide-in guides 3 are provided for forward and return movement of a cassette 2 between an original position, shown in FIG. 1, and an operative position, shown in FIG. 2. On the fixed frame 1 one or more magnetic heads, and pressure rollers (not shown), are mounted for cooperation with the tape. Mounted on the fixed frame 1 is a movable frame in the form of a plate 4, carrying the tape drive capstan 5 and the reel hub spindle 5' which are drive members that penetrate into the cassette 2 in order to interact therewith. This tape deck is of the type disclosed in commonly assigned U.S. Pat. Nos. 3,385,534 and 4,208,023 which describe the movable frame 4 as being supported on a fixed frame 1 to follow the in-and-out movements of the cassette while simultaneously moving perpendicularly relative to the plane of cassette movement to carry the drive members into and out of openings in the face of the cassette.

The requisite perpendicular movement of the movable frame 4 relative to the plane of cassette movement is provided, in this case, by inclined slots 8 in the lateral sides 1', 1" of the fixed frame 1 receiving rollers or studs 7 on the movable frame 4. The fixed frame 1 has an inverted U-shape with vertical lateral sides 1', 1". A portion of one side 1' has been broken away in FIG. 1, revealing the other lateral side 1" and the movable frame 4 shown in section. As described in U.S. Pat. No.

4,208,023, the movable frame 4 is comprised of an essentially flat plate 4' which extends between the lateral sides 1', 1" of the fixed frame 1. On the plate 4', a motor is mounted connected by a belt to a flywheel (not shown) journalled on the plate 4' and carrying the capstan 5. The reel spindle 5' is also journalled on the plate 4' and, while only a single capstan 5 and reel spindle 5' are shown, in practice it is preferred to have a pair of capstans and spindles driven by the drive motor. The rollers or studs 7 are carried on downwardly extending sides 4" of the movable frame 4 and project through the inclined slots 8 in the lateral sides 1' of the fixed frame so that the movable frame 4 raises and lowers perpendicularly relative to the cassette as it translates horizontally. The perpendicular movement relative to the cassette 2 is utilized to penetrate the drive members, including the capstan 5 and spindle 5', into the cassette 2 during its forward movement and to withdraw the drive members from the cassette during its return movement. In such constructions, forward movement of the cassette to the operative position, when carried out by manual force, is transmitted directly to the movable frame 4 by a push rod 6 and that manual force is converted to the desired perpendicular movement of the movable frame 4 by the inclined slots 8 in the lateral sides 1' of the fixed frame 1.

Thus, FIG. 1 illustrates the position of the tape deck components with a cassette 2 introduced into the guides 3 and in its original position. By forward translational movement of the cassette 2, the movable frame 4 and components carried thereby are brought into the operative position shown in FIG. 2 by the action of the cassette on the push rod 6 and, consequently, on the movable frame 4 which is biased toward its original position by the spring 21. The movable frame 4 and cassette 2 are maintained in the operative position by means of a latch on the side wall 1' of the fixed frame 1, herein provided by a latch member 9, which, in its position of rest shown in FIG. 1, bears on a stop 20. The latch member 9 is pivotable about a pin 10 carried by the side wall 1' of the fixed frame 1 and is subjected to the action of a spring 11 which extends between a projection 12 on the frame 1 and an opening 13, to fix the spring to the latch member 9. The latch member 9 is engagable as shown in FIG. 2 with the stud 7 when the movable frame 4 is fully raised and in its operative position, which stud 7 serves as a latch element.

As shown in FIG. 2, the spring 11 biases the latch member 9 to place the lug 17 of the latch member 9 in engagement with the stud 7 and thereby holds the movable frame in operative position, as shown in FIG. 2. In the course of movement of the movable frame to the operative position, the stud 7 engages the under edge of the lug 17 and rotates the latch member 9 clockwise to allow the stud 7 to pass the lug 17 and enter the horizontal segment 23 of the slot 8, the spring 11 being effective to return the latch member 9 to its latching position shown in FIG. 2. In the operative position, the capstan 5 and reel hub spindle 5' are fully engaged with the cassette 2 and, when driven by a drive motor, will operate to drive the tape from reel to reel.

To release the movable frame 4 and eject the cassette 2, means are provided for disengaging the latch member 9 from the latch element 7. For this purpose, the core 15 of an electromagnet 16 is connected at 14 to the latch member such that when current is supplied to the electromagnet 16, its core 15 is retracted, causing the latch member 9 to pivot about the pin 10 in a clockwise direction. The movement will free the stud 7 retained by the lug 17 and thus permit, under the action of the spring 21, the return translational movement and descent of the movable frame 4 and the return movement of the cassette 2 toward its original position.

According to the invention, to avoid a forceful and unrestrained ejection of the cassette 2 by the unrestrained return of the movable frame 4, means are provided on the fixed frame 1 for momentarily interrupting the return movement of the movable frame to provide a two-step return of the cassette. For this purpose, the latch member 9 and the means for momentarily interrupting the return movement are combined, in this case by providing the latch member 9 with a sloping forward edge 18 ending in a curved lug 19 which, as shown in FIG. 3, receives the stud 7 in the course of its return movement toward the original position of the movable frame.

To achieve the desired momentary interruption in the return movement of the movable frame 4, it has been found advantageous to supply a pulse of current to the electromagnet 16, causing the latch member 9 to pivot in a clockwise direction and thus free the movable frame 4 which descends under the action of gravity and the spring 21, being guided by its stud 7 in the slots 8 in the vertical walls of the fixed frame 1. In carrying out the invention, the latch member 9 is held in its disengaged position, as shown in FIG. 3, by maintaining the energization of the electromagnet 17 and holding the core 15 of the electromagnet 16 retracted for a brief interval, a fraction of a second, long enough to retain the curved lug 19 of the latch member 9 in position to be engaged by and stop the stud 7 and thereby interrupt the return movement of the movable frame 4.

Further in keeping with the invention, the curved lug 19 and the forward edge 18 of the latch member 9 are constructed and arranged so that at least one of the driving members carried by the movable frame 4, the capstan 5 or reel hub spindle 5', which penetrate the cassette in the operative position, remain engaged with the cassette until the movable frame 4 is finally released so that the momentary interruption in the movement of the movable frame 4 is transmitted to the cassette so as to interrupt its return movement. The momentary interruption of the return of the movable frame 4, therefore, preferably occurs near the fully returned position. By this provision, after the momentary interruption in its movement, the cassette 2 is subjected to the return action of the movable frame 4 during as short a time and as short a travel as possible, to assure the precise placing of the cassette 2 in its original position.

To finally release the movable frame 4, the current pulse to the electromagnet 16 is then cut off and, under the influence of the spring 11, the latch 9 pivots about its pin 10 in counterclockwise direction. The stud 7 is then disengaged from the curved lug 19 of the latch member 9 and the movable frame 4 can then complete its movement to its fully returned position, as shown in FIG. 1, under the force of gravity and the return spring 21.

I claim:

1. A tape deck for cassettes, said tape deck having a fixed frame, guide means for guiding a cassette in its forward and return movement between original and operative positions, a movable frame mounted for forward and return movement, drive members on said movable frame which penetrate and engage said cassette in the course of movement to operative position and retract upon return movement, means connecting said movable frame to return the cassette on return movement of said movable frame, the improvement in said tape deck comprising:

- a latch element on said movable frame;
- latch means on said fixed frame for engaging said element and holding said movable frame in operative position;
- means for disengaging said latch means from said element to release said movable frame and permit the return movement of said movable frame toward the original position; and
- means on said fixed frame for momentarily interrupting the return movement of said movable frame in the course of said movement to provide a two step return of the cassette.

2. A tape deck according to claim 1 wherein a drive member on said movable frame remains in engagement with the cassette upon said momentary interruption in the return movement of said movable frame to interrupt the return movement and provide a two step return of the cassette.

3. A tape deck according to claim 1 wherein said momentary interruption in the return movement of said movable frame occurs near a fully returned position.

4. A tape deck according to claim 2 wherein said momentary interruption in the return movement of said movable frame occurs near a fully returned position.

5. A tape deck according to any of claims 1 to 4 wherein said latch means and said means for momentarily interrupting the return movement of said movable frame are combined.

6. A tape deck according to any of claims 1 to 4 wherein said latch means and said means for momentarily interrupting the return movement of said movable frame are combined and include a latch member pivotably mounted on said fixed frame having a first lug engagable with said latch element to hold said movable frame in operative position, and a second lug engagable with said latch element to interrupt the return movement of said movable frame.

7. A tape deck according to claim 6 including a spring for holding said latch member with said first lug engaged with said latch element, and electromagnet means for pivoting said latch member to disengage said latch element from said first lug.

8. A tape deck according to claim 7 wherein said electromagnet means is energized to pivot said latch member, both to disengage said latch element from said first lug providing the first step in return of the cassette and to engage said second lug with said latch element to interrupt said return, and is de-energized to release said latch element from said second lug providing the second step in return of the cassette.

* * * * *